United States Patent Office 2,717,898
Patented Sept. 13, 1955

2,717,898

PRODUCTION OF 1-AMINOANTHRAQUINONE-2-CARBOXYLIC ACID AMIDES

Friedrich Ebel, Mannheim-Feudenheim, and Rüdolf Randebrock, Ludwigshafen (Rhine), Germany, assignor to Badische Anilin- & Soda-Fabrik Aktiengesellschaft, Ludwigshafen am Rhine, Germany No Drawing. Application March 24, 1953,
Serial No. 344,476

Claims priority, application Germany April 12, 1952

4 Claims. (Cl. 260—377)

This invention relates to a process for the production of 1-aminoanthraquinone-2-carboxylic acid amides.

We have found that 1-aminoanthraquinone-2-carboxylic acid amides can be obtained, and if desired heterocyclic compounds of the anthraquinone series can be obtained therefrom, by reacting 1.2-phthaloylisatoic acid anhydride with amino compounds containing at least one hydrogen atom attached to nitrogen and if desired converting the 1 - aminoanthraquinone - 2 - carboxylic acid amides first formed, if their composition allows, into heterocyclic compounds of the anthraquinone series in known manner in the same or a separate operation by splitting off water, hydrogen halide or ammonia.

The reaction proceeds, for example, according to the general scheme:

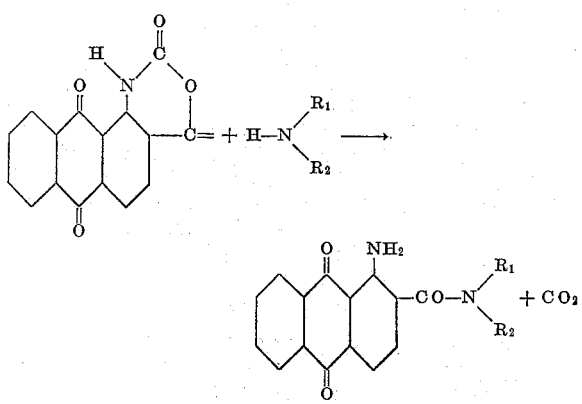

wherein $R_1$ may be hydrogen or an organic radical and $R_2$ may be an organic radical, if desired different from $R_1$.

The 1.2-phthaloylisatoic acid anhydride may contain any substituents in the anthraquinone nucleus, as for example halogen atoms or hydroxy, alkoxy, nitro, acylamino, carbonamido, alkyl or aryl groups, and benzene, pyridine or triazole nuclei may also be attached.

Primary or secondary aliphatic, aromatic or heterocyclic amines may be used for the reaction, such as methylamine, dimethylamine, butylamines, aniline, N-methylaniline, guanidine, benzamidine, hydrazides, thiosemicarbazides, aminopyridines and aminoanthraquinones. Compounds with two or more amino groups in one molecule are also suitable, such as hydrazine, phenylhydrazine, ethylene diamine, benzidine, tolidine, dianisidine, phenylene diamine or diaminoanthraquinones. Such amines can be reacted one or more times with the 1.2-phthaloylisatoic acid anhydrides. The amines reacted only unilaterally may then be further reacted with the free amino groups still remaining in any desired manner.

By the reaction with amines, the same carboxylic acid amides are obtained as can be obtained by the reaction of 1-aminoanthraquinone-2-carboxylic acid halides with amines. The advantage of the employment of 1.2-phthaloylisatoic acid anhydrides instead of the corresponding 1-aminoanthraquinone-2-carboxylic acid chlorides lies in the fact that the former are more easily prepared, can be stored without limit and are also stable at high temperatures, properties which are not shared by the said carboxylic acid chlorides. Furthermore, by the reaction of the 1.2-phthaloylisatoic acid anhydrides with amines, only carbon dioxide is formed which does not further impair the reactions, whereas in the reaction of 1-aminoanthraquinone-2-carboxylic acid halides with amines, hydrogen halides are formed which often are attended by corrosion difficulties and moreover convert part of the amines to be reacted into hydrohalides which are thus withdrawn from the reaction, a fact which makes itself objectionably evident, especially with the more strongly basic amines.

It is also known that carboxylic acid amides of the said kind are obtained by reacting 1-nitroanthraquinone-2-carboxylic acid halides with amines and converting the nitro groups in the carboxylic acid amides first formed into amino groups either by reduction or sometimes also by treatment with ammonia. While this method of working obviates the use of the relatively unstable 1-aminoanthraquinone-2-carboxylic acid halides, an additional working operation has to be taken into consideration and moreover undesirable side reactions occur, for example during the exchange of the nitro groups with ammonia.

When the constitution of the carboxylic acid amides first formed according to this invention is suitable, they can be converted into heterocyclic compounds of the anthraquinone series. For example if there is, in the orthoposition of an aromatic amine employed, another amino group or a mercapto or hydroxyl group or a hydrogen atom, such carboxylic acid amides can be converted into azoles, such as imidazoles, thiazoles or oxazoles, by splitting off water or hydrogen halide. From the hydrozides formed with hydrazine oxidazoles are formed for example by splitting off water, and from the reaction products obtained with amidines, hydroxypyrimidines are obtained by splitting off ammonia. In these cases it is often not necessary, and in many cases impossible, to isolate the carboxylic acid amides first formed, but the first reaction may be directly followed by the further reaction to form heterocyclic compounds.

The following examples will further illustrate this invention but the invention is not restricted to these examples. The parts are by weight.

Example 1

A mixture of 5 parts of 1.2-phthaloylisatoic acid anhydride prepared by reacting 1-aminoanthraquinone-2-carboxylic acid in nitrobenzene with phosgene at about 140° C., and 120 parts of a 33% aqueous solution of methylamine is heated at 70° C. for 5 hours while stirring. The reaction product is then filtered off by suction and the residue remaining is dried. 3.2 parts of the known 1-aminoanthraquinone-2-carboxylic acid methylamide are obtained which after recrystallisation from glacial acetic acid is obtained in the form of red needles (melting point 234° C.).

Example 2

A mixture of 3 parts of 1.2-phthaloylisatoic acid anhydride and 30 parts of di-isobutylamine is boiled for 2 hours while stirring. By distilling off the excess of diisobutylamine, about 2 parts of 1-aminoanthraquinone-2-carboxylic acid di-isobutylamide separate out (melting point 131° to 132° C.). It dissolves in concentrated sulfuric acid giving at first a red colouration which changes to yellow after a short time. The color of its vat is red.

Example 3

A mixture of 3 parts of 1.2-phthaloylisatoic acid anhydride and 15 parts of aniline is boiled for 2 hours while stirring. Red needles separate with evolution of carbon dioxide. After cooling, the deposited reaction product is filtered off by suction, washed with methanol and dried. 1-aminoanthraquinone-2-carboxylic acid anilide (melting point 271° to 272° C.) is obtained in the calculated yield in the form of red needles which dissolve in concentrated sulfuric acid giving a yellow-brown coloration and give a red vat with alkaline sodium hyposulfite solution.

Example 4

A mixture of 3 parts of 1.2-phthaloylisatoic acid anhydride and 50 parts of monomethylaniline is boiled for 2 hours while stirring. The whole passes into solution while becoming red in color and evolving gas. By concentration, 2.9 parts of 1-aminoanthraquinone-2-carboxylic acid-N-methylanilide separate in the form of compact red crystals (melting point 198° C.) which dissolve in concentrated sulfuric acid giving a yellow coloration and give a red vat.

Example 5

A mixture of 20 parts of 1.2-phthaloyl-3-nitroisatoic acid anhydride and 300 parts of aniline is boiled for a short time while stirring until, with the evolution of gas, the solution has become dark red in color. 13.5 parts of 1-amino-4-nitroanthraquinone-2-carboxylic acid anilide (melting point above 300° C.) separate in the form of large red needles which are isolated in the usual manner. They dissolve in concentrated sulfuric acid giving a yellow coloration and may be vatted with a wine-red color.

Example 6

A mixture of 5.86 parts of 1.2-phthaloylisatoic acid anhydride, 6.84 parts of 1-amino-5-benzoylaminoanthraquinone, 5 parts of pyridine and 150 parts of nitrobenzene is heated at 100° C. for 1 hour and at 180° C. for 4 hours while stirring. After working up in the usual way, a dyestuff is obtained which dyes cotton red-brown shades from a red-brown vat.

Example 7

A mixture of 11.72 parts of 1.2-phthaloylisatoic acid anhydride, 9.56 parts of 2-hydroxy-3-aminoanthraquinone and 250 parts of trichlorbenzene is heated to boiling within 3 hours while stirring; 2 parts of paratoluene sulfonic acid are then added and heating to boiling continued for 2 hours. After cooling, the deposited dyestuff is filtered off by suction, washed with trichlorbenzene and methanol and dried, 16.7 parts of 2-(1-aminoanthraquinonyl-2-)-(anthraquinone-2'(N).3':4.5-oxazole), which is already known from specification No. 1,790,102, are thus obtained. It dyes powerful red shades of good fastness from a brown vat.

Example 8

6 parts of benzamidine are dissolved in 300 parts of nitrobenzene at 40° to 50° C. while stirring. 14.7 parts of 1.2-phthaloylisatoic acid anhydride are slowly added to this solution, whereby it becomes violet-red in color. It is further stirred for about 2 hours at 40° to 50° C. and the compound which separates after cooling is filtered off by suction. 14.4 parts of 1-aminoanthraquinone-2-carboxylic acid benzamidide are obtained in the form of violet needles which melt at 217° to 218° C.

5 parts of the 1-aminoanthraquinone-2-carboxylic acid benzamidide thus obtained are boiled in 300 parts of acetic anhydride for about 30 minutes while stirring. After cooling, 4.05 parts of 2-phenyl-4-hydroxy-7.8-phthaloylquinazoline separate in the form of pale yellow needles, which melt at above 300° C. and dissolve in concentrated sulfuric acid giving a pale yellow coloration. The splitting off of ammonia while producing ring closure can also be effected with sulfuric acid or acetic acid.

Example 9

A solution of 3 parts of hydrazine hydrate in 7 parts of methanol is added to a suspension of 1 part of 1.2-phthaloylisatoic acid anhydride in 12 parts of nitrobenzene and the mixture is heated at 80° C. for about 15 minutes while stirring. After cooling and allowing to stand for some time, 1-aminoanthraquinone-2-carboxylic acid hydrazide separates in practically the calculated yield in the form of red needles (melting point 258° C.). It dissolves in concentrated sulfuric acid giving a yellow coloration and yields a red vat.

1-amino-4-methoxyanthraquinone-2-carboxylic acid hydrazide is obtained in the form of brown-violet needles (melting point 225° C.) in the same way from 1.2-phthaloyl-3-methoxyisatoic acid anhydride and hydrazine; it dissolves in concentrated sulfuric acid with a yellow coloration and yields an orange vat.

Example 10

A mixture of 28.1 parts of the 1-aminoanthraquinone-2-carboxylic acid hydrazide obtained according to Example 9, paragraph 1, 29.3 parts of 1.2-phthaloylisatoic acid anhydride and 500 parts of nitrobenzene is heated to 160° C. for 4 hours while stirring. It is then allowed to cool and the deposited red needles are filtered off by suction, washed with methanol and dried. 48 parts of N.N'-di-(1-aminoanthraquinone-2-carbonyl)hydrazine which melts at above 300° C. are obtained; it dissolves in concentrated sulfuric acid with a pale yellow coloration and dyes cotton violet-red shades from a red vat.

Example 11

Into a mixture of 5.86 parts of 1.2-phthaloylisatoic acid anhydride and 6000 parts of nitrobenzene there are allowed to flow while stirring 55 parts of hydrazine hydrate, whereby carbon dioxide escapes and the color of the mixture turns deep red. The temperature of the mixture is then raised during 12 hours to 190° C. and maintained at this temperature for 1 hour. After cooling the separated dyestuff is filtered off by suction, washed with small amounts of nitrobenzene and methanol and dried. There are obtained 498 parts (=94 per cent of the calculated yield) of N.N'-di-(1-aminoanthraquinone-2-carbonyl)-hydrazine in the form of red needles. The dyestuff is identical with that of Example 10.

Example 12

A mixture of 5.86 parts of 1.2-phthaloylisatoic acid anhydride, 3.76 parts of a 13.3% methanol solution of hydrazine hydrate and 60 parts of nitrobenzene is heated for 1 hour at 60° C. and 1 hour at 120° C. while stirring. 10 parts of solvent are then distilled off, the whole allowed to cool, 7 parts of thionyl chloride added and the whole heated for 10 hours at 185° C. while stirring. After cooling, the deposited dyestuff is filtered off by suction, washed with methanol and dried. 2.9 parts of di-(1-aminoanthraquinonyl-2-)oxdiazole are obtained, corresponding to a yield of 56.6%. It dissolves in concentrated sulfuric acid with a pale yellow coloration and dyes cotton bluish-green, very fast shades from a Bordeaux red vat.

Hydrazine hydrate itself, or anhydrous hydrazine, may be used instead of a methanol solution of hydrazine hydrate. For the ring closure there may be used oleum instead of thionyl chloride.

Example 13

A mixture of 70.4 parts of 1.2-phthaloylisatoic acid anhydride, 23 parts of benzidine and 1000 parts of nitrobenzene is heated, while stirring, for 1 hour at 60° C., for 1 hour at 120° C. and for 3 hours at 180° C. After the usual working up of the cooled reaction mixture, 79 parts of di(1-aminoanthraquinone-2-carboxylic acid-) benzidide are obtained in the form of orange-red needles (melting point above 300° C.) which dissolve in concentrated sulfuric acid with a yellow-brown coloration and dye cotton very fast red shades of great color strength from a brownish-red vat.

Example 14

A mixture of 14.7 parts of 1.2-phthaloylisatoic acid anhydride, 5.3 parts of tolidine and 200 parts of nitrobenzene is heated, while stirring, for 1 hour at 60° C., for 1 hour at 120° C. and for 3 hours at 180° C. After cooling, the deposited dyestuff is filtered off by suction, washed with methanol and dried. Di-(1-aminoanthraquinone-2-carboxylic acid-)tolidide is obtained in the form of pale red needles (melting point above 300° C.) which dissolve in concentrated sulfuric acid with a brown-yellow coloration and dye cotton powerful scarlet-red shades of very good fastness from a brownish red vat.

In a similar way there is obtained from dianisidine di-(1 - aminoanthraquinone - 2 - carboxylic acid-)dianisidide (melting point above 300° C.) which dissolves in concentrated sulfuric acid with a yellow-brown coloration and dyes cotton brilliant bluish-red shades of good fastness from a brownish-red vat. With benzidine-3.3'-dicarboxylic acid there is obtained 3.3'-dicarboxy-di-(1-aminoanthraquinone-2-carboxylic acid-) benzidide (melting point above 300° C.) which dissolves in concentrated sulfuric acid with a yellow-brown coloration and dyes cotton powerful Bordeaux colored shades from a red vat.

Example 15

A mixture of 6.46 parts of 1.2-phthaloyl-3-methoxyisatoic acid anhydride, 1.84 parts of benzidine and 75 parts of nitrobenzene is heated, while stirring, for 1 hour at 60° C., for 1 hour at 120° C. and for 3 hours at 180° C. After the usual working up, 6.5 parts of di-(1-amino-4-methoxyanthraquinone - 2 - carboxylic acid - ) benzidide (melting point above 300° C.) are obtained in the form of currant-colored needles which dissolve in concentrated sulfuric acid with a brown coloration and dye cotton red-violet shades of very great color strength and good fastness properties from a red vat. From tolidine there is obtained di-(1-amino-4-methoxyanthraquinone-2-carboxylic acid-)tolidide (melting point above 300° C.) which dissolves in concentrated sulfuric acid with a brown coloration and dyes cotton ruby-colored shades from a red vat: with dianisidine there is obtained di-(1-amino-4-methoxyanthraquinone-2-carboxylic acid-)dianisidide (melting point above 300° C.) which dissolves in concentrated sulfuric acid with a brown coloration and dyes cotton violet shades of great color strength from a red vat.

Example 16

A mixture of 3.28 parts of 1.2-phthaloyl-3-chlorisatoic acid anhydride, 1.06 parts of 4.4'-diamino-3.3'-dimethyldiphenyl and 40 parts of nitrobenzene is heated, while stirring, for 1 hour at 60° C., for 1 hour at 120° C. and for 3 hours at 180° C. After the usual working up, 2.8 parts of di-(1-amino-4-chloranthraquinone-2-carboxylic acid-)tolidide (melting point 290° to 291° C.) are obtained in the form of pale red needles which dissolve in concentrated sulfuric acid with a yellow-brown coloration and dye cotton red-brown shades of good fastness properties from a red-brown vat.

Example 17

A mixture of 7.4 parts of 1.2-phthaloylisatoic acid anhydride, 2.5 parts of diaminothiazolyl and 100 parts of nitrobenzene is heated for 6 hours at 120° C. while stirring. After the usual working up, 8.7 parts of the brown-red di(1-aminoanthraquinone-2-carboxylic acid amido-)-dithiazolyl (melting point above 300° C.) are obtained as a brown-red powder which dissolves in concentrated sulfuric acid with a golden-yellow coloration and is reprecipitated therefrom by the addition of water in red flocks which become blue in color without passing into solution upon the addition of caustic soda solution. The new dyestuff dyes cotton powerful violet-red shades from a red-brown vat.

What we claim is:

1. A process for the production of 1-aminoanthraquinone-2-carboxylic acid hydrazides which comprises reacting a 1,2-phthaloylisatoic acid anhydride with a hydrazine.

2. A process for the production of a 1-aminoanthraquinone-2-carboxylic acid amide which comprises reacting 1 mol of 1.2-phthaloylisatoic acid anyhydride with 1 mol of hydrazine.

3. The process for the production of 1-aminoanthraquinone-2-carboxylic acid amide which comprises reacting 1 mol of 1.2-phthaloylisatoic acid anhydride with 1 mol of 1-aminoanthraquinone-2-carboxylic acid hydrazide.

4. The process for the production of a 1-aminoanthraquinone-2-carboxylic acid amide which comprises reacting 2 mols of 1.2-phthaloylisatoic acid anhydride with 1 mol of hydrazine.

FOREIGN PATENTS 39,460     France _____ Aug. 11, 1931

OTHER REFERENCES

Clark et al., Jour. of Organic Chemistry, v. 9, pages 55–67 (1944.)